United States Patent
Khosravi et al.

(10) Patent No.: US 8,856,515 B2
(45) Date of Patent: Oct. 7, 2014

(54) IMPLEMENTATION OF ROBUST AND SECURE CONTENT PROTECTION IN A SYSTEM-ON-A-CHIP APPARATUS

(71) Applicant: Intel Corporation, Santa Clara, CA (US)

(72) Inventors: Hormuzd M. Khosravi, Portland, OR (US); David A. Lee, Portland, OR (US); Raji Srinivasa Raghavan, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 16 days.

(21) Appl. No.: 13/694,221

(22) Filed: Nov. 8, 2012

(65) Prior Publication Data

US 2014/0129827 A1    May 8, 2014

(51) Int. Cl.
*H04L 9/32* (2006.01)
(52) U.S. Cl.
USPC ............. 713/156; 713/193; 726/16; 380/277
(58) Field of Classification Search
USPC ........................................ 713/156
See application file for complete search history.

(56) References Cited

U.S. PATENT DOCUMENTS

| | | | |
|---|---|---|---|
| 6,324,288 B1 * | 11/2001 | Hoffman | 380/249 |
| 7,813,822 B1 * | 10/2010 | Hoffberg | 700/94 |
| 8,205,238 B2 | 6/2012 | Blumenthal et al. | |
| 8,295,484 B2 | 10/2012 | Buer et al. | |
| 2002/0163522 A1 | 11/2002 | Porter et al. | |
| 2004/0243823 A1 * | 12/2004 | Moyer et al. | 713/200 |
| 2005/0114687 A1 * | 5/2005 | Zimmer et al. | 713/193 |
| 2005/0213768 A1 | 9/2005 | Durham et al. | |
| 2006/0133604 A1 * | 6/2006 | Buer et al. | 380/28 |
| 2007/0156987 A1 * | 7/2007 | Chen et al. | 711/163 |

(Continued)

FOREIGN PATENT DOCUMENTS

| | | |
|---|---|---|
| TW | 2013-40692 A | 10/2013 |
| WO | 2013/089725 A1 | 6/2013 |
| WO | 2013/089726 A1 | 6/2013 |
| WO | 2013/089728 A1 | 6/2013 |

OTHER PUBLICATIONS

International Search Report & Written Opinion Received dated Aug. 27, 2012 for PCT Application No. PCT/US2011/065094, 10 pages.

(Continued)

*Primary Examiner* — Kambiz Zand
*Assistant Examiner* — Yonas Bayou
(74) *Attorney, Agent, or Firm* — L. Cho

(57) ABSTRACT

A content processing integrated circuit includes a system-on-a-chip (SoC) that further includes a processor to receive an authentication request from an external device for authenticating if the SoC is permitted to receive encrypted content from the external device, and to receive the encrypted content once the SoC is authenticated. An authentication processor is provided and coupled to the processor to authenticate the SoC to the external device when the processor receives the authentication request, and to generate a decryption key for decrypting the encrypted content. A decryption processor is provided and coupled to the processor and the authentication processor to receive the decryption key from the authentication processor and to decrypt the encrypted content with the decryption key. A wireless display system with such SoC is also described. A method of implementing a secure and robust content protection in a SoC is also described.

27 Claims, 11 Drawing Sheets

(56) References Cited

U.S. PATENT DOCUMENTS

| | | | |
|---|---|---|---|
| 2007/0209072 A1* | 9/2007 | Chen | 726/16 |
| 2008/0022395 A1* | 1/2008 | Holtzman et al. | 726/19 |
| 2008/0037793 A1 | 2/2008 | Buer | |
| 2008/0148061 A1 | 6/2008 | Jin et al. | |
| 2008/0177998 A1* | 7/2008 | Apsangi et al. | 713/155 |
| 2008/0229104 A1* | 9/2008 | Ju et al. | 713/169 |
| 2010/0299525 A1 | 11/2010 | Shah et al. | |
| 2011/0023077 A1* | 1/2011 | Simon | 725/134 |
| 2011/0154061 A1* | 6/2011 | Chilukuri et al. | 713/193 |
| 2011/0231923 A1 | 9/2011 | Bollay et al. | |
| 2012/0079287 A1* | 3/2012 | Leclercq | 713/192 |
| 2012/0137137 A1 | 5/2012 | Brickell et al. | |
| 2013/0080764 A1 | 3/2013 | Khosravi et al. | |
| 2013/0275769 A1 | 10/2013 | Khosravi et al. | |
| 2013/0297936 A1* | 11/2013 | Khosravi et al. | 713/168 |

OTHER PUBLICATIONS

International Search Report & Written Opinion Received dated Jul. 18, 2012 for PCT Application No. PCT/US2011/065072, 10 pages.

PCT Application No. PCT/US2011/065094, filed Dec. 15, 2011, 24 pages.

PCT Application No. PCT/US2011/065072 filed Dec. 15, 2011, 31 pages.

International Search Report and Written Opinion received for PCT Patent Application No. PCT/US2013/000253, mailed on Feb. 27, 2014, 13 pages.

Wikipedia, The Free Encyclopedia, "Diffie-Hellman key exchange", Available at: <hhttp://en.wikipedia.org/w/index.php?title=Diffie%E2%80%93Hellman_key_exchange&oldid=464229141>, accessed Dec. 8, 2011, 9 pages.

Wikipedia, The Free Encyclopedia, "Elliptic curve cryptography," Available at: <http://en.wikipedia.org/w/index.php?title=Elliptic_curve_cryptography&oldid=464634149>, accessed Dec. 8, 2011, 8 pages.

Wikipedia, The Free Encyclopedia, "HTTP Secure", Available at: [http://en.wikipedia.org/w/index.php?title=HTTP_Secure&oldid=465003157], accessed Dec. 10, 2011, 6 pages.

Wikipedia, The Free Encyclopedia, "Scrambler", Available at: <http://en.wikipedia.org/w/index.php?title=Scrambler&oldid=460036487>, accessed Dec. 8, 2011, 4 pages.

Wikipedia, The Free Encyclopedia, "Transport Layer Security", Available at: [http://en.wikipedia.org/w/index.php?title=Transport_Layer_Security&oldid=464220022], retrieved on Dec. 10, 2011, 19 pages.

Bajikar, "Trusted Platform Module (TPM) based Security on Notebook PCs", White Paper, Mobile Platforms Group, Jun. 20, 2002, 20 pages.

Intel Corp., "Product Brief: Intel® Atom™ Processor CE4100", 2009, 4 pages.

* cited by examiner

Session Key Exchange

TX

Generates session key $K_s$ and 64-bit pseudo-random number $r_{iv}$

Performs key derivation to generate $dkey_2$

Encrypt 128-bit Session Key
$E_{dkey}(k_s) = k_s \text{ XOR } (dkey_2 \text{ XOR } r_{rx})$ Send $E_{dkey}(k_s)$ and $r_{iv}$ $$E_{dkey}(k_s) + r_{iv} \longrightarrow$$

RX

Performs key derivation to generate $dkey_2$

Decrypt 128-bit Session Key
$K_s = E_{dkey}(k_s) \text{ XOR } (dkey_2 \text{ XOR } r_{rx})$

FIG. 11

IMPLEMENTATION OF ROBUST AND SECURE CONTENT PROTECTION IN A SYSTEM-ON-A-CHIP APPARATUS

TECHNICAL FIELD

Embodiments of the present disclosure relate to secure content delivery and display. More specifically, embodiments of the present disclosure relate to an improved implementation of robust and secure content protection in a system-on-a-chip apparatus.

BACKGROUND

As is known, media content access by content users is changing from opportunistic access to on-demand access. On-demand media content, as well as some standard media content, is often delivered by streaming the content to a multimedia receiving platform, such as a set-top box, a smart phone, a computer tablet, a laptop computer, or the like, for content display. If the multimedia content is premium content, the multimedia content is often protected in some manner during transmission to the multimedia receiving platform. For example, various Digital Rights Management (DRM) and Conditional Access (CA) technologies may be used to provide protection for the media content from the media source to the multimedia receiving platform. Such technologies generally involve encryption of the content media.

A system-on-a-chip (SoC) device is an integrated circuit that incorporates various components of electronic systems on a single die or substrate. For example, a SoC integrated circuit may include a processor core, memory, video components, audio components, and/or communication components on a single chip. Due to their relatively small size, SoCs are used in many multimedia receiving platforms.

BRIEF DESCRIPTION OF THE DRAWINGS

The features and advantages of the disclosure are illustrated by way of example and are by no means intended to limit the scope of the disclosure to the particular embodiments shown.

FIG. 11 illustrates the sequence and data flows between a wireless transmitter and a wireless SoC receiver of a wireless display system during session key exchange and decryption according to an exemplary embodiment of the present disclosure.

DESCRIPTION OF THE EMBODIMENTS

In the following description, for purposes of explanation, specific nomenclature is set forth to provide a thorough understanding of embodiments of the present disclosure. It will be apparent to one skilled in the art that specific details in the description may not be required to practice the embodiments. In other instances, well-known circuits, devices, and programs are shown in block diagram form to avoid obscuring embodiments of the present disclosure unnecessarily.

Figure 1:
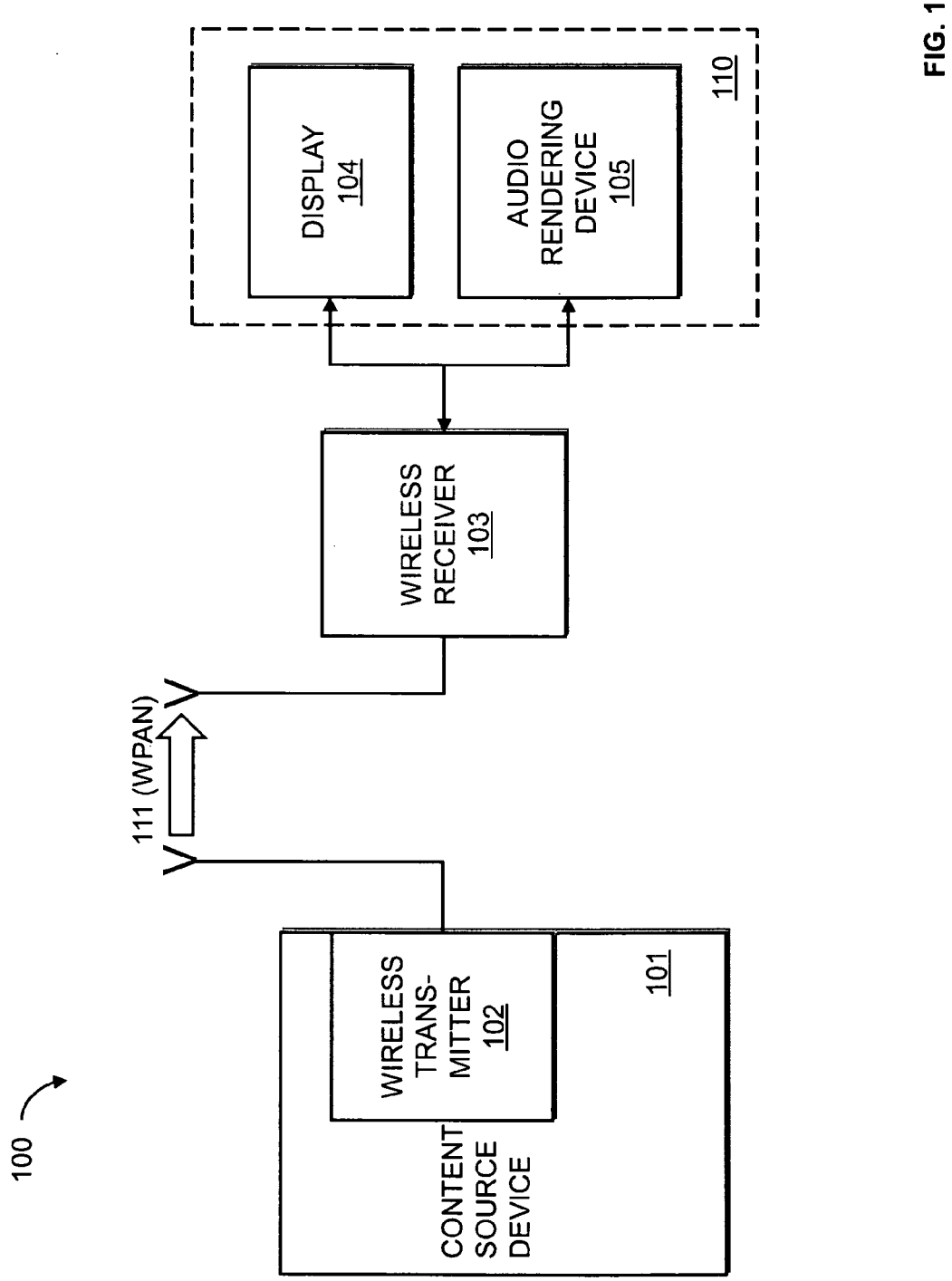
FIG. 1 is an architectural overview of a wireless display system that includes a wireless system-in-a-chip (SoC) receiver according to an exemplary embodiment of the present disclosure.

FIG. 1 illustrates an overall architecture of a wireless display system 100 that includes a content source device 101 with a transmitter 102 and a wireless system-on-a-chip (SoC) receiver 103 that implement a secure and robust content protection scheme according to embodiments of the present disclosure. FIGS. 2-7 illustrate the structure and operations of various components of such a SoC receiver integrated circuit as the SoC receiver 103 of FIG. 1 and FIGS. 8-11 show sequences and data flows between devices of the wireless display system 100.

Prior to the wireless display system 100, various Digital Rights Management (DRM) and Conditional Access (CA) technologies have been used to provide protection for the media content from the media source to the media receiving devices. High-bandwidth Digital Content Protection (HDCP) is one such technology offered by Digital Content Protection LLC. The technology is developed to prevent copying of digital audio and video content as the content travels across connections. These connections include Digital Visual Interface (DVI) and High Definition Multimedia Interface (HDMI).

One of the functions of the HDCP protocol is to authenticate receiving devices and generate or exchange decryption keys for the receiving devices during authentication. If the receiving device is authenticated as authorized to receive HDCP-encrypted content, the corresponding transmitter encrypts the content data to prevent eavesdropping as the content data travel to the receiving device. The receiving device then decrypts the encrypted content data using the decryption key generated or exchanged.

One prior way of implementing the HDCP authentication and key exchange functions is in software form running on a processor of the receiving device. One problem associated with this prior approach is that the keys are not secure and easy to be "discovered" or hacked by malware or spyware. This is due to the fact that the keys are stored at software level and need to be accessible to various software codes and the underlying operating system running on the processor, which makes it possible for unauthorized access to these keys via malware or spyware.

Figure 2:
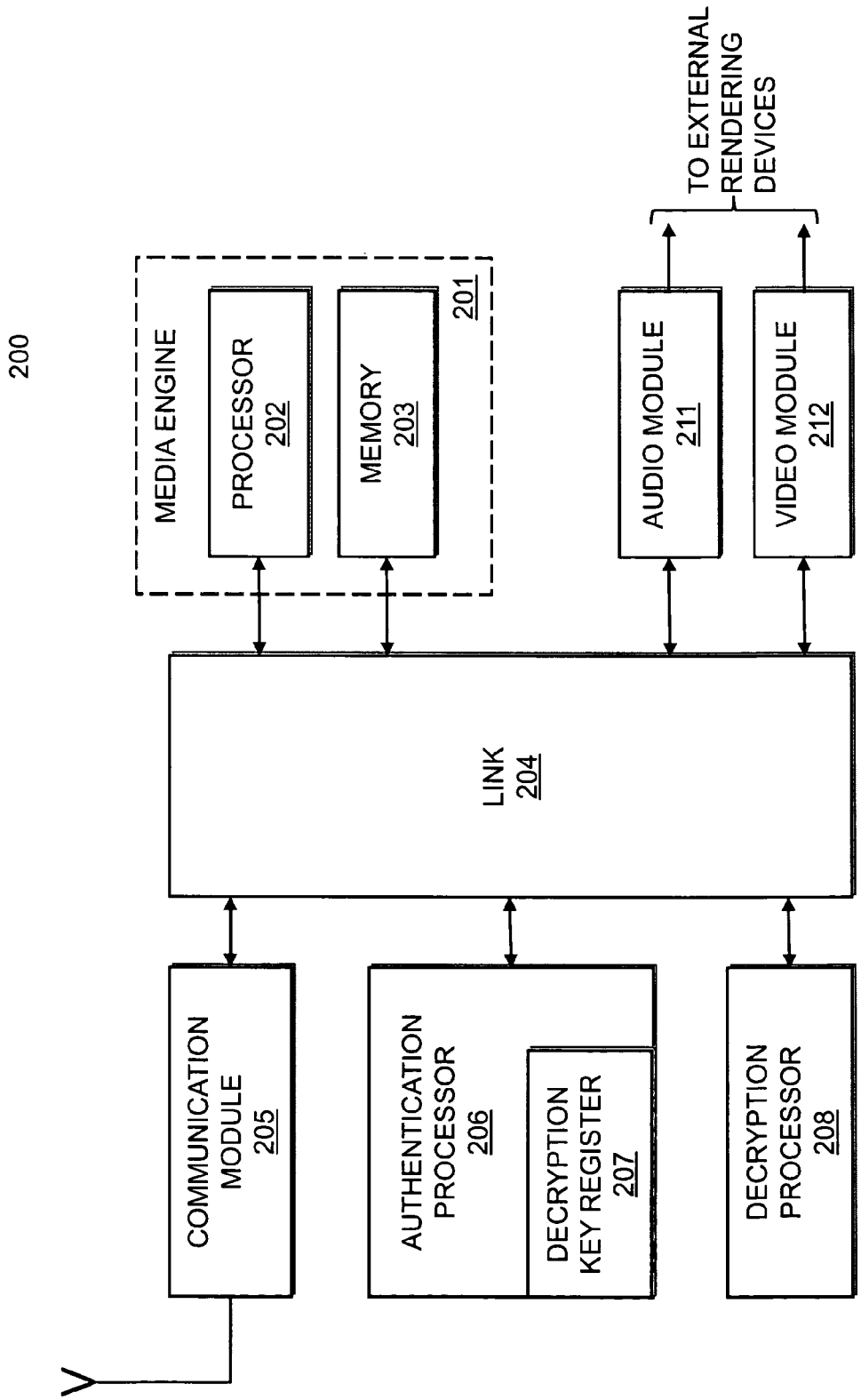
FIG. 2 illustrates the structure of a wireless SoC receiver of a wireless display system that includes a media engine, an authentication processor, and a decryption processor according to an exemplary embodiment of the present disclosure.

FIG. 2 illustrates the structure of a SoC receiver integrated circuit 200 that may implement the wireless SoC receiver 103 of FIG. 1 to provide secure and robust content protection in accordance with one embodiment of the present disclosure. According to one embodiment of the present disclosure and as will be described in more detail below, the SoC receiver integrated circuit 200 includes an authentication processor 206 and a decryption processor 208 in addition to a media engine 201 that includes a processor 202 and a memory 203. The memory 203 stores software code to be executed on the processor 202. The media engine 201 (i.e., the processor 202) does not perform the device authentication and decryption key generation or exchange functions. It also does not perform the content decryption operation using the decryption key. Instead, these device authentication and decryption key generation or exchange functions are delegated to the authentication processor 206 and the content decryption using the decryption key function is delegated to the decryption processor 208.

In addition, the decryption key, once generated in the authentication processor 206, is not sent to the processor 202 of the media engine 201. Instead, the decryption key is stored in a processor register (i.e., register 207) of the authentication processor 206 and is shared with the decryption processor 208 via backdoor key loading. According to an embodiment of the disclosure, the backdoor key loading technique refers to a procedure where two components or processors securely sharing secret information via hardware level registers that are shared between the two components or processors. In the present embodiment, the authentication processor 206 and the decryption processor 208 "share" processor register (e.g., register 207) of the authentication processor 206, which provides a secure channel for sharing the secret decryption key between the two processors. In other words, the description processor 208 has access to the processor register (e.g., the register 207) of the authentication processor 206 that stores the secret and decrypted decryption key.

One advantage of the above described implementation is that by employing the authentication processor 206 (instead of the processor 202), none of the software code running on the processor 202 can have access to the authentication process, thus making the authentication and decryption key exchange process robust and secure.

Another advantage of the above described implementation is that the decryption key is not exposed to any software code running on the processor 202 as the key is not received in the processor 202, thus avoiding the possibility of being hacked or accessed via malware or spyware running in the media engine 202. This provides secure and robust content protection for the SoC receiver integrated circuit 200, as well as the wireless display system 100 of FIG. 1. The wireless display system 100 and the SoC receiver integrated circuit 200 (FIG. 2) will be described in more detail below, also in conjunction with FIGS. 1 through 11.

Throughout the specification, the following terms are defined as follows.

The term "content", "media content", or "multimedia content" refers to a combination of text, audio, still image, animation, video, and/or interactive content.

The term "wireless", "wirelessly", or "wireless communication" refers to the electronic transfer of information between two or more points that are not physically connected.

The term "display" refers to content rendering, and is not limited to visual displaying or rendering. It can refer to displaying of (or visual rendering of) video or audio content. It can also refer to rendering audio content via a speaker or an earphone.

The term "SoC (system-on-a-chip)" refers to an integrated circuit that incorporates various components of electronic systems on a single die or substrate. For example, a SoC may include one or more processors, memories, microprocessors, microcontrollers, video components, audio components, and/or communication components on a single chip.

The term "processor" refers to a data processing circuit that can be a microprocessor, a co-processor, a microcontroller, a microcomputer, a central processing unit, a field programmable gate array (FPGA), a programmable logic circuit, and/or any circuit that manipulates signals (analog or digital) based on operational instructions that are stored in a memory.

The term "memory" refers to a storage circuit or multiple storage circuits such as read-only memory, random access memory, volatile memory, non-volatile memory, static memory, dynamic memory, flash memory, cache memory, and/or any circuit that stores digital information.

In general, schematic elements used to represent instruction blocks may be implemented using any suitable form of machine-readable instruction, such as software or firmware applications, programs, functions, modules, routines, processes, procedures, plug-ins, applets, widgets, code fragments and/or others, and that each such instruction may be implemented using any suitable programming language, library, application programming interface (API), and/or other software development tools. For example, some embodiments may be implemented using Java, C++, and/or other programming languages. Similarly, schematic elements used to represent data or information may be implemented using any suitable electronic arrangement or structure, such as a register, data store, table, record, array, index, hash, map, tree, list, graph, file (of any file type), folder, directory, database, and/or others.

Further, in the drawings, where connecting elements, such as solid or dashed lines or arrows, are used to illustrate a connection, relationship or association between or among two or more other schematic elements, the absence of any such connecting elements is not meant to imply that no connection, relationship or association can exist. In other words, some connections, relationships or associations between elements may not be shown in the drawings so as not to obscure the disclosure. In addition, for ease of illustration, a single connecting element may be used to represent multiple connections, relationships or associations between elements. For example, where a connecting element represents a communication of signals, data or instructions, it should be understood by those skilled in the art that such element may represent one or multiple signal paths (e.g., a bus), as may be needed, to effect the communication.

Referring to FIG. 1, the wireless display system 100 is employed to transmit content from the content source device 101 to a content rendering system 110 of the wireless display system 100 for content rendering. The content can be a combination of text, audio, still image, animation, video, and/or interactive content. The content rendering system 110 is connected to the wireless receiver 103 via wire connection. The content rendering system 110 includes a display 104 and an audio rendering device 105. The display 104 can be a television (TV) display, a high definition TV (HDTV) display, a computer monitor or display, or a projection display. The audio rendering device 105 can be one or more speakers and/or earphones (including headsets).

The content source device 101 can be a smartphone, a tablet computer, a laptop computer, a desktop computer, a mobile Internet device, a set-top box, or other devices capable of generating or delivering media content. The content source device 101 may include a content generator (such as a DVD player) or may obtain the media content from a remote source on-demand via Internet.

The content source device 101 includes a wireless transmitter 102. The wireless transmitter 102 is used to transmit media content from the content source device 101 to the rendering system 110 via the wireless receiver 103. The wireless transmitter 102 communicates with the wireless receiver 103 using the same wireless communication protocol. The wireless communication technology or protocol employed can be Bluetooth (also known as IEEE 802.15.1 standard), Wi-Fi (also known as IEEE 802.11 standard), HomeRF (Home Radio Frequency standard), Infrared, ZigBee (also known as IEEE 802.15.4 standard). The content source device 101, including the transmitter 102, can be implemented using known means. Thus, their structure and operation will not be described in more detail below.

The wireless receiver 103 may be embodied in a set-top box, a smartphone, a smart display, a tablet computer, a laptop computer, a desktop computer, a mobile Internet device, or other device capable of delivering media content. The wireless receiver 103 may be configured to deliver any type of media content including, for example, movies, pictures, images, songs, audio and/or video recordings, and/or any other type of audio, video, and/or audio and video content.

The wireless network 111 is a wireless personal area network (WPAN) according to one embodiment of the present disclosure. In another embodiment, the wireless network 111 is a wireless local area network. In a further embodiment, the wireless network 111 can be a combination of wired and wireless networks.

Moreover, the wireless display system 100 may include one or more repeaters (not shown in FIG. 1). A repeater includes a transmitter circuit like the transmitter 102 and a receiver circuit (like the receiver 103) combined together. It functions as a communication relay station between the transmitter 102 and the receiver 103.

In FIG. 1, the wireless display system 100 is shown to have its content source device 101 communicate wirelessly with its wireless receiver 103 through the wireless network 111. This implements one embodiment of the present disclosure. However, the display system 100 is not limited to this wireless implementation. For example, the communication between the content source device 101 and the receiver 103 can be a wired network or a combination of wired and wireless networks.

In accordance with one embodiment of the present disclosure, the media content transmitted between the transmitter 102 and the receiver 103 is protected or encrypted. One protocol or standard for such content protection or encryption is the High-bandwidth Digital Content Protection (HDCP) standard. The HDCP standard has many versions, including HDCP 1.0 version and HDCP 2.0 version. As described above, HDCP is a content protection protocol that is used to protect media content.

In one embodiment, the HDCP content protection protocol utilizes cryptographic techniques in accordance with the Advanced Encryption Standard (AES) which describes a symmetric encryption technique (also known as Rijndael algorithm) that can encrypt (encipher) and decrypt (decipher) information. A detailed description of the AES can be found in the Federal Information Processing Standards Publication 197 (FIPS PUB 197), dated Nov. 26, 2001. In another embodiment, the HDCP content protection protocol utilizes asymmetric cryptographic techniques.

Many modes of operations may be employed for the AES encryption and decryption operation. Modes of operation include Electronic Code Book (ECB), Cipher-Block Chaining (CBC), Output Feedback (OFB), Counter and Cipher-Feedback (CFB) that provide confidentiality for messages of arbitrary length. Other modes of operation such as Counter with Cipher Block Chaining-Message Authentication Code (CCM), Galois Counter Mode (GCM) and Offset Codebook Mode (OCB) ensure both confidentiality and message integrity.

According to one embodiment of the present disclosure, the SoC circuit implementation of the receiver 103 provides a secure and robust authentication and content decryption for the content transmitted in the wireless display system 100. The structure and operation of the receiver 103 will be described in more detail below, also in conjunction with FIGS. 2-11.

In FIG. 2 and as described above, the wireless SoC receiver integrated circuit 200 may implement the wireless receiver 103 of FIG. 1 according to an exemplary embodiment of the present disclosure. As shown in FIG. 2, the wireless SoC receiver integrated circuit 200 includes the media engine 201, the authentication processor 206, and the decryption processor 208 according to an exemplary embodiment of the present disclosure. The media engine 201 includes the processor 202 and the memory 203. The processor 202 functions as the main processor of the wireless SoC receiver integrated circuit 200 while the memory 203 stores software program codes that are executed on the processor 202. The memory 203 may have a storage area that can be accessed by the authentication processor 206 and/or the decryption processor 208. Other processors of the wireless SoC receiver integrated circuit 200 may function as co-processors, mini-processors, or microcontrollers of the processor 202. In one embodiment, components of the wireless SoC receiver integrated circuit 200 reside on the same substrate or within the same chip.

In one embodiment, the processor 202 is a central processing unit (CPU) like microprocessor. In another embodiment, the processor 202 is a simple data processing unit. The communication between the processor 202 and other processors like processors 206 and 208 is done using an inter-processor call communication protocol. The structure and function of the processor 202 may be implemented using known technology.

The wireless SoC receiver integrated circuit 200 includes a communication module 205 that implements communication protocols to effect the wireless communication of the wireless SoC receiver integrated circuit 200 with external devices. The communication protocols implemented may include TCP/IP (Transmission Control Protocol/Internet Protocol), UDP/IP (User Datagram Protocol/Internet Protocol), RTSP (Real Time Streaming Protocol), RTP (Real-time Transport Protocol), and MPEG-TS (Motion Picture Experts Group-Transport Stream). The wireless communication technology employed can be Bluetooth, Wi-Fi, HomeRF, Infrared, and ZigBee. The structure and functions of the communication module 205 may be implemented using known technologies.

The wireless SoC receiver integrated circuit 200 also includes an audio module 211 and a video module 212. The audio module 211 is employed to process audio content data and send the processed data to an external rendering device. The video module 212 is employed to process video content data and send it to an external rendering device. The structure and functions of these two modules are known and will not be described in more detail below.

All modules, components, or functional blocks within the wireless SoC receiver integrated circuit 200 are connected together via a communication link 204. The communication link 204 can be simply referred to as a link 204. In one embodiment, the link 204 is a simple common bus that is provided to pass data, information, and/or instructions among all the modules or components of the wireless SoC receiver integrated circuit 200. In another embodiment, the link 204 collectively represents various dedicated communication links or buses between any two components of the wireless SoC receiver integrated circuit 200. In this case, any pair of components within the wireless SoC receiver integrated circuit 200 has a dedicated communication link or connection and the link 204 represents them all collectively. The link 204 can be implemented using any known bus technology or can simply be electrical connection wires.

According to one embodiment of the present disclosure, the media engine 201 (i.e., the processor 202) does not perform the device authentication and decryption key generation or exchange functions. It also does not perform the content decryption operation for the content received in the wireless SoC receiver integrated circuit 200. Instead, these device authentication and decryption key generation or exchange functions are delegated to the authentication processor 206 and the content decryption function is delegated to the decryption processor 208.

In addition, the decryption key, once generated in the authentication processor 206, is not sent to (or accessible by) the processor 202 of the media engine 201. Instead, the decryption key is stored in a processor register (i.e., register 207) and is shared only by the decryption processor 208 via backdoor key loading. As described above, the backdoor key loading technique refers to a procedure where two components or processors securely sharing secret information via hardware level registers that are shared between the components or processors. In the embodiment of the SoC 200, the authentication processor 206 and the decryption processor 208 "share" processor register (e.g., register 207) of the authentication processor 206, which provides a secure channel for sharing the secret decryption key between the two processors. In other words, the description processor 208 has access to the processor register (e.g., the register 207) of the authentication processor 206 that stores the secret and decrypted decryption key. This prevents the decryption key from being exposed to any software code running on the processor 202 as the key is not received by the processor 202. This reduces the possibility of being hacked or accessed via malware or spyware running in the media engine 202. This provides secure and robust content protection for the SoC receiver integrated circuit 200 (and thus the wireless display system 100 of FIG. 1).

Figure 3:
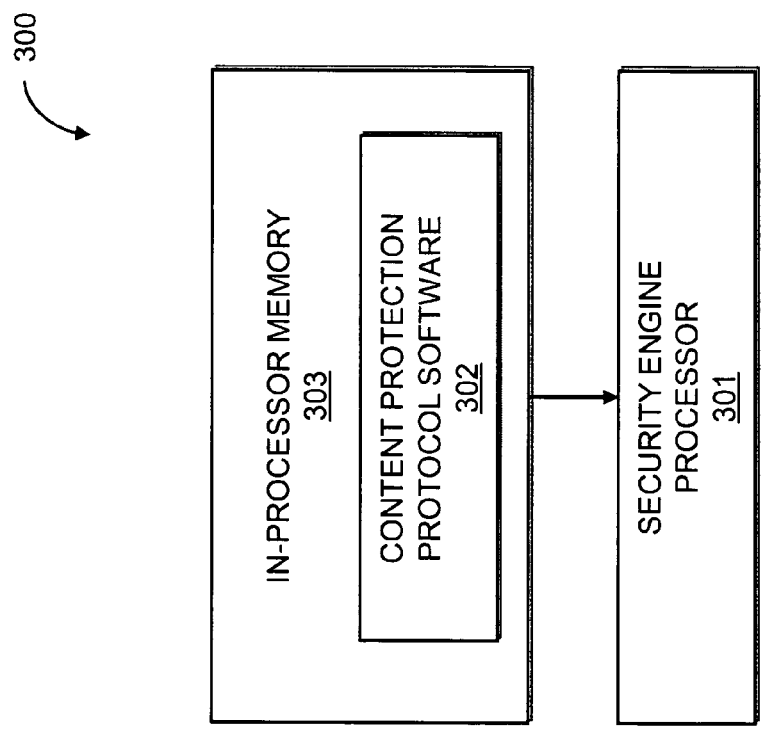
FIG. 3 illustrates the structure of an authentication processor of a wireless SoC receiver of a wireless display system according to an exemplary embodiment of the present disclosure.

FIG. 3 illustrates the structure of an authentication processor 300 within a SoC integrated circuit according to an exemplary embodiment of the present disclosure. The authentication processor 300 may implement the authentication processor 206 of the SoC integrated circuit 200 of FIG. 2. As can be seen from FIG. 3, the authentication processor 300 includes a security engine processor 301 and an in-processor memory 303 that stores content protection protocol software 302 and is only accessible by the security engine processor 301. In one embodiment, the content protection protocol software 302 implements the HDCP content protection protocol.

Figure 4:
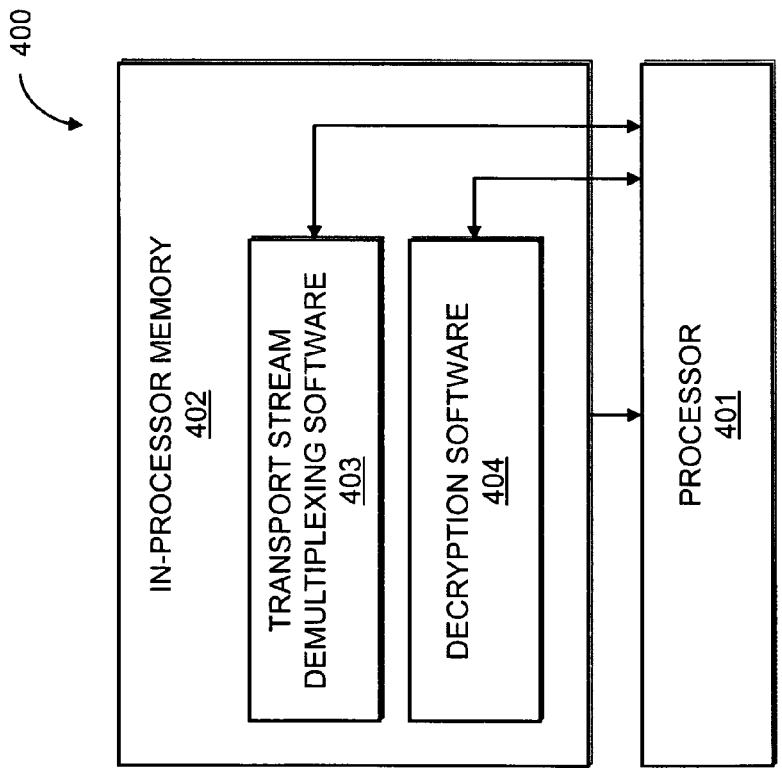
FIG. 4 illustrates the structure of a decryption processor of a wireless SoC receiver of a wireless display system according to an exemplary embodiment of the present disclosure.

The security engine processor 301 may be embodied as a security co-processor or processing circuitry separate from the main processor of the SoC (e.g., the SoC 200 of FIG. 2). In one embodiment, the security engine processor 301 is a co-processor, a microcontroller, a microcomputer, and/or any circuit that manipulates signals (analog or digital) based on operational instructions that are stored in a memory. The security engine processor 301 includes a random number generator (not shown) and a processor register (i.e., the register 207 in FIG. 2) that can be employed to store decrypted keys. The structure of the security engine processor 301 is known and thus will not be described in more detail below:

FIG. 4 illustrates the structure of a decryption processor 400 that may implement the decryption processor 208 of FIG. 2 according to an exemplary embodiment of the present disclosure. As can be seen from FIG. 4, the decryption processor 400 includes a processor hardware circuit 401 and a memory 402 that stores software program codes 403 and 404 that are executed on the processor hardware circuit 401. The software program code 403 is a transport stream de-multiplexing software program and the software program code 403 implements content decryption function. In other words, the processor 400 performs both the transport stream de-multiplexing function to separate video from audio content and the content decryption function.

The processor hardware circuit 401 can be implemented by any known processor or microcontroller or co-processor and thus will not be described in more detail. The decryption software code 404 is HDCP-based decryption code and the decryption operation is known and will not be described in more detail below.

Figure 5:
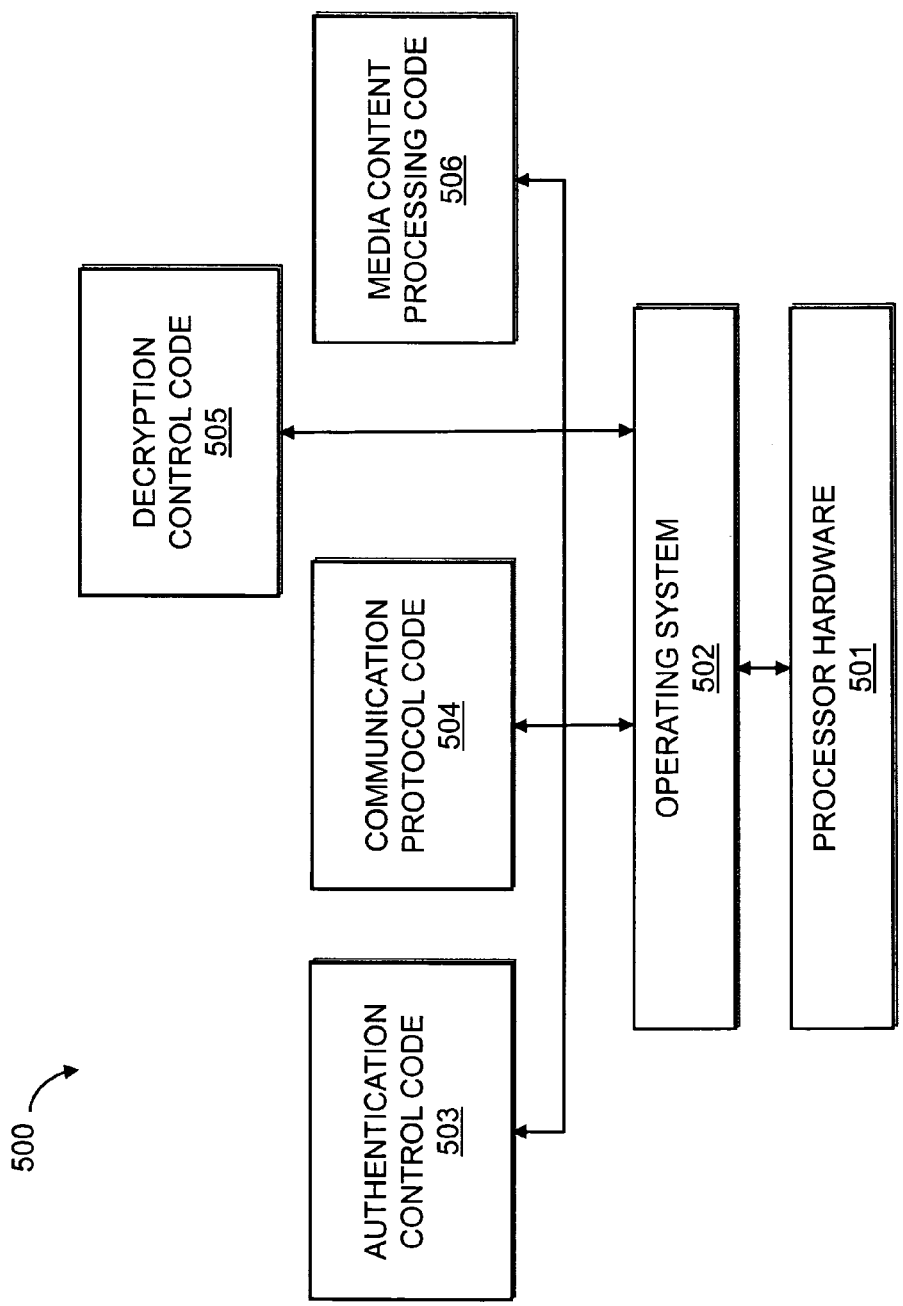
FIG. 5 is the overview of a media engine of a wireless SoC receiver of a wireless display system according to an exemplary embodiment of the present disclosure.

FIG. 5 illustrates the structure of a media engine 500 that may implement the media engine 201 of FIG. 2 according to an exemplary embodiment of the present disclosure. As illustrated in FIG. 5, the media engine 500 includes processor hardware 501 and an operating system 502 running on the processor hardware 501. On top of the operating system 502, software program codes 503-506 are provided that are run on the operating system 502. The operating system 502 and codes 503-506 are stored in a memory (not shown in FIG. 5) of the media engine 500.

Code 503 is an authentication control code that controls interaction and interfacing of the media engine 500 (i.e., the processor hardware 501) with other components (e.g., the authentication processor 206 of FIG. 2) of the SoC circuit (i.e., the SoC circuit 200 of FIG. 2) during authentication and key exchange. Code 503 implements the HDCP protocol. It may include a HDCP library and a HDCP library API (Application Programming Interface). It may also include security engine processor API and security engine processor driver, as well as HDCP inter-processor call communication protocol code.

Figure 6:
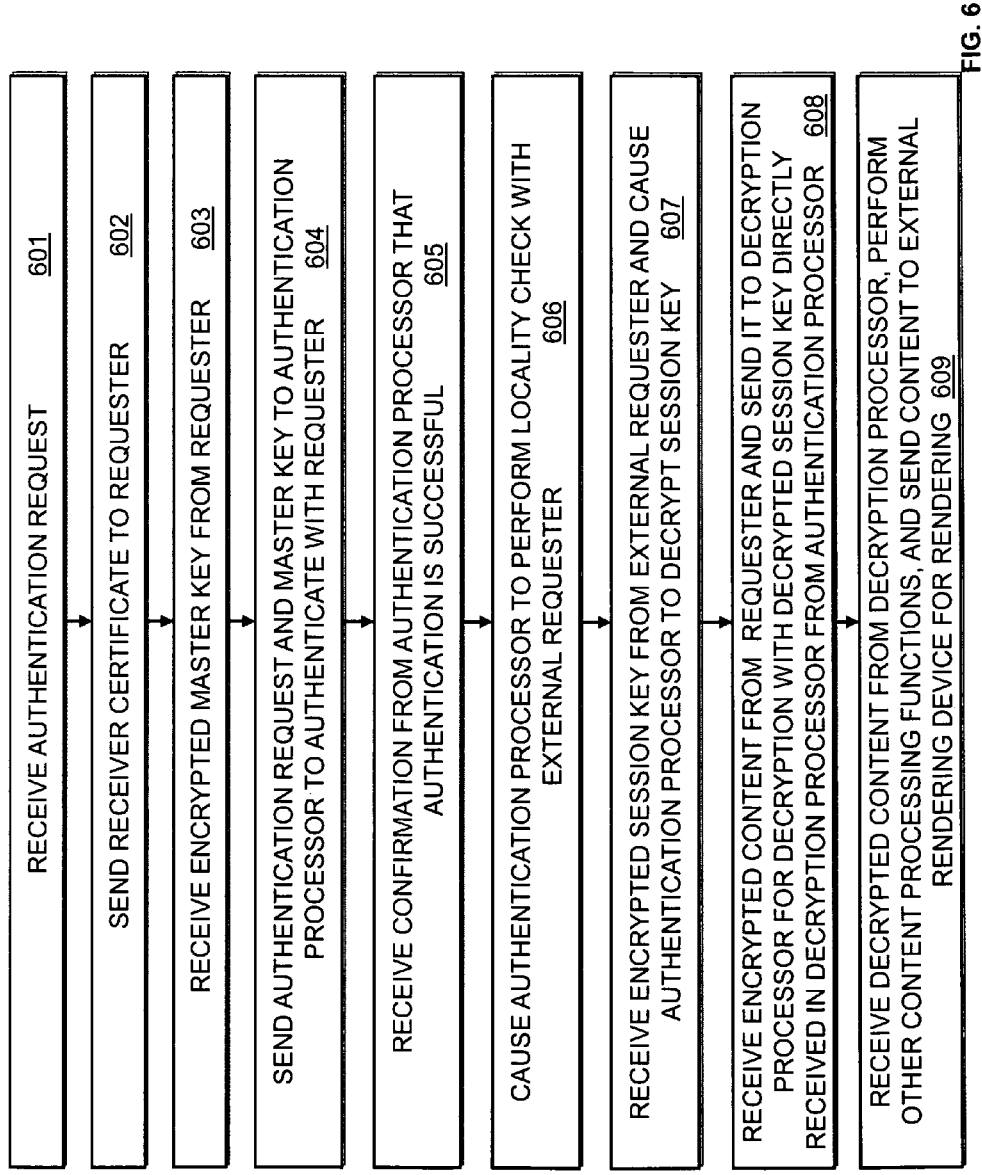
FIG. 6 is a flow chart diagram showing the procedure performed by a media engine of a wireless SoC receiver of a wireless display system for device authentication and content encryption according to an exemplary embodiment of the present disclosure.

Code 505 is a decryption control code that controls interaction and interfacing of the media engine 500 (i.e., the processor hardware 501) with other components (e.g., the decryption processor 208 of FIG. 2) of the SoC circuit (i.e., the SoC circuit 200 of FIG. 2) during decryption. FIG. 6 shows the procedure and operation of the codes 503 and 505, which will be described in more detail below.

FIG. 6 illustrates a procedure of device authentication, key decryption, and content decryption according to an exemplary embodiment of the present disclosure. The procedure shown in FIG. 6 may be performed by a processor 202 of FIG. 2 and may be implemented by the authentication control code 503 of FIG. 5.

The procedure starts at 601 at which the processor receives an AKE_init (Authentication and Key Exchange Initiation) message. The AKE_init message includes a 64 bit random number $r_{tx}$ generated by the transmitter (e.g., the transmitter 102) and a message ID. The transmitter can also be referred to as the requester. The random number $r_{rx}$ serves both as device ID of the transmitter and the authentication request.

At 602, the processor sends back a certificate $Cert_{rx}$ to the transmitter.

At 603, the processor receives an encrypted master key $K_m$. The master key $K_m$ is generated and encrypted with a receiver public key $Kpub_{rx}$ at the transmitter/requester. As described above, this encryption operation is performed with RSA-1024 with RSA OAEP padding.

At 604, the processor sends $r_{rx}$ and the encrypted master key $K_m$ to an authentication processor (e.g., the authentication processor 206 of FIG. 2). The master key $K_m$ is then decrypted by the authentication processor (e.g., the processor 206 of FIG. 2) with private key values that are in the Chinese Remainder Theorem Format. The decryption is carried out in the authentication processor using Chinese Remainder Theorem calculations. In addition, the authentication processor also calculates H' value (i.e., =HMAC-SHA256 ($r_{rx}$XOR REPEATER, $K_d$) after successfully decrypting the master key $K_m$. The H' value is sent to the transmitter for verifying if the authentication is successful. The processor is not involved in the decryption and H's value calculation operation.

In addition and at 604, the processor also sends back to the transmitter the random number $r_{rx}$. The random number $r_{rx}$ serves as device ID of the receiver and the confirmation that the encrypted master key has been received in the receiver.

At 605, the processor receives confirmation from the transmitter whether the authentication is successful or not. If successful, the processor receives the locality check command $r_n$ from the transmitter.

At 606, the processor causes the authentication processor to perform the locality check operation by sending $r_n$ to the authentication processor. The authentication processor (e.g., the authentication processor 206 of FIG. 2) then computes L' values (i.e., =HMAC-SHA256($r_n$, $k_d$XOR $r_{rx}$). The L' values are then sent to the processor via a shared memory between the two processors. The L' values then sent back to the transmitter for verification with the L values calculated in the transmitter. For the successful completion of authentication and locality check, the computed L' values have to be transmitted to the transmitter within a predetermined time period. When the transmitter initiates the message for the locality check, it sets up a watchdog timer. The message from the receiver should reach the transmitter within the time specified.

At 607, the processor receives an encrypted session key from the transmitter or requester. The session key is used by the decryption processor (e.g., the decryption processor 208 of FIG. 2) to decrypt encrypted content sent by the transmitter. Thus, the session key is the decryption key.

The session key $K_s$ is generated in the transmitter with a 64 bit pseudo-random number $r_{iv}$. The transmitter then performs key derivation to generate dkey2. The transmitter then encrypts the 128 session key to be $E_{dkey}(K_s)$=$K_s$XOR (dkey$_2$XOR$r_{rx}$). The transmitter then sends the encrypted session key $K_s$ with the 64 bit pseudo-random number $r_{iv}$ to the receiver and received by the processor.

The processor passes the encrypted session key $K_s$ with $r_{iv}$ to the authentication processor to decrypt the session key. The processor is not involved in the session key decryption and does not have access to the decrypted session key. This prevents software code running on the processor from accessing the decrypted session key. This provides secure and robust content protection for the wireless display system such as the system 100 of FIG. 1.

At 608, the processor receives encrypted content from the transmitter, sends it to the decryption processor (e.g., the decryption processor 208) for decryption with the decrypted session key directly loaded to the authentication processor to the decryption processor via the backdoor key loading technique.

At 609, the processor receives the decrypted content and performs other content processing functions. The processor then sends the content to the external rendering device (e.g., the content rendering system 110 of FIG. 1) for rendering.

Figure 7:
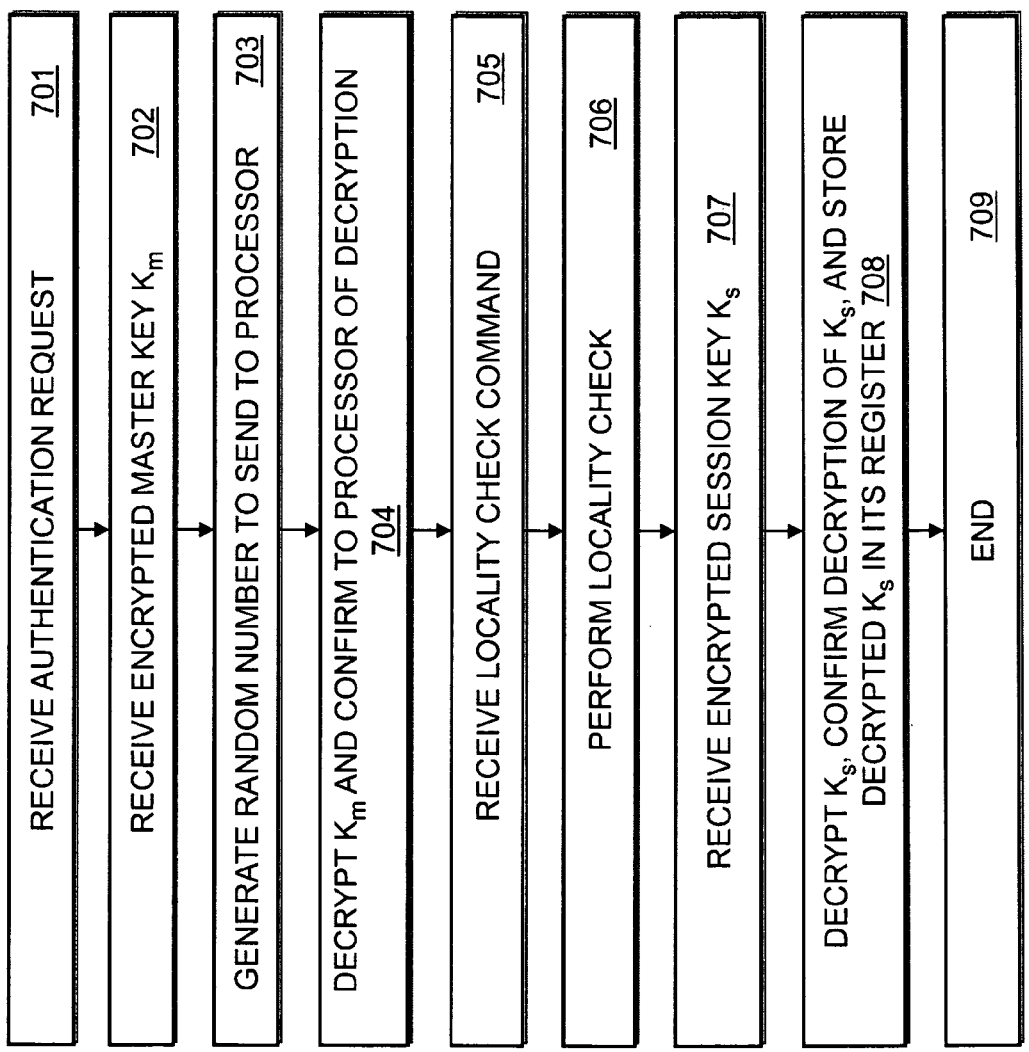
FIG. 7 is a flow chart diagram showing the procedure performed by an authentication processor of a wireless SoC receiver of a wireless display system for device authentication and key decryption according to an exemplary embodiment of the present disclosure.

FIG. 7 illustrates a procedure of device authentication and key decryption according to an exemplary embodiment of the present disclosure. The procedure shown in FIG. 7 may be performed by an authentication processor of a wireless SoC receiver of a wireless display system such as the authentication processor 206 of FIG. 2.

The procedure starts at 701 at which the authentication processor receives an authentication request $r_{rx}$ from the processor (e.g., the processor 202 of FIG. 2). This is done by the software code (e.g., authentication control code 503 of FIG. 5) stored in memory (e.g., the memory 203 of FIG. 2). The software code writes the authentication request $r$, into a memory commonly shared by the processors (e.g., 202 and 206 of FIG. 2) and the authentication processor copies $r_{rx}$ into its internal memory through an AKE_init IPC call (i.e., an authentication and key exchange initialization inter-processor call).

At 702, the authentication processor receives an encrypted master key $K_m$. As described above, the master key $K_m$ is encrypted with a public key $Kpub_{rx}$ in the transmitter (e.g., the transmitter 102 of FIG. 1).

At 703, the authentication processor generates a random number $r_{rx}$ using its random number generator. The random number $r_{rx}$ is passed to the processor via an inter-processor call command.

At 704, the authentication processor decrypts the master key $K_m$ with a private key $Kpriv_{rx}$. The private key values used to decrypt the $K_m$ are in the Chinese Remainder Theorem Format. The decryption is carried out in the authentication processor using Chinese Remainder Theorem calculations. In addition, the authentication processor calculates H' value (i.e., =HMAC-SHA256 ($r_{rx}$XOR REPEATER, $K_d$). The H' value is used by the transmitter to verify whether the authentication is successful or not. The H' value is then sent back to the processor by writing it in an output payload region of the shared memory between the processor and the authentication processor. The processor then sends the H' value to the transmitter for verification with H value calculated in the transmitter.

At 705, the authentication processor receives the locality check command $r_n$ from the processor. This is done by the authentication control code running on the processor that writes the command in an input payload region of a memory shared by the two processors and then the authentication processor copies that command into its internal memory.

At 706, the authentication processor performs locality check by computing L' values (i.e., =HMAC-SHA256($r_n$, $k_d$XOR $r_{rx}$). The L' values are then sent to the processor via a shared memory between the two processors. The processor then sends the L' values to the transmitter for verification with L values calculated in the transmitter. For the successful completion of authentication and locality check, the computed L' values have to be transmitted to the transmitter within a predetermined time period for the locality check to be successful.

At 707, the authentication processor receives an encrypted session key $K_s$ and a 64 bit pseudo-random number $r_{iv}$.

At 708, the authentication processor decrypts the session key. This is done by first performing key derivation to generate $dkey_2$. Then the authentication processor decrypts the 128 bit session key $K_s$ to be $E_{dkey}(K_s)\text{XOR}(dkey_2\text{XOR}r_{rx})$. The authentication processor also calculates Ks XOR 1c128. The decrypted key is then stored in a processor register, waiting to be loaded to the decryption processor (e.g., the decryption processor 208 of FIG. 2) via a backdoor key loading. Before the decrypted session key is loaded to the decryption processor, the decrypted session key is not accessible by software codes running on the processor (e.g., the processor 202 of FIG. 2).

FIGS. 6-7 are flow charts illustrating procedures or functions according to embodiments of the present disclosure. The techniques illustrated in these figures may be performed sequentially, in parallel or in an order other than what is described. The techniques may be also be performed once or more times. It should be appreciated that not all of the techniques described are required to be performed, that additional techniques may be added, and that some of the illustrated techniques may be substituted with other techniques.

Figure 8:
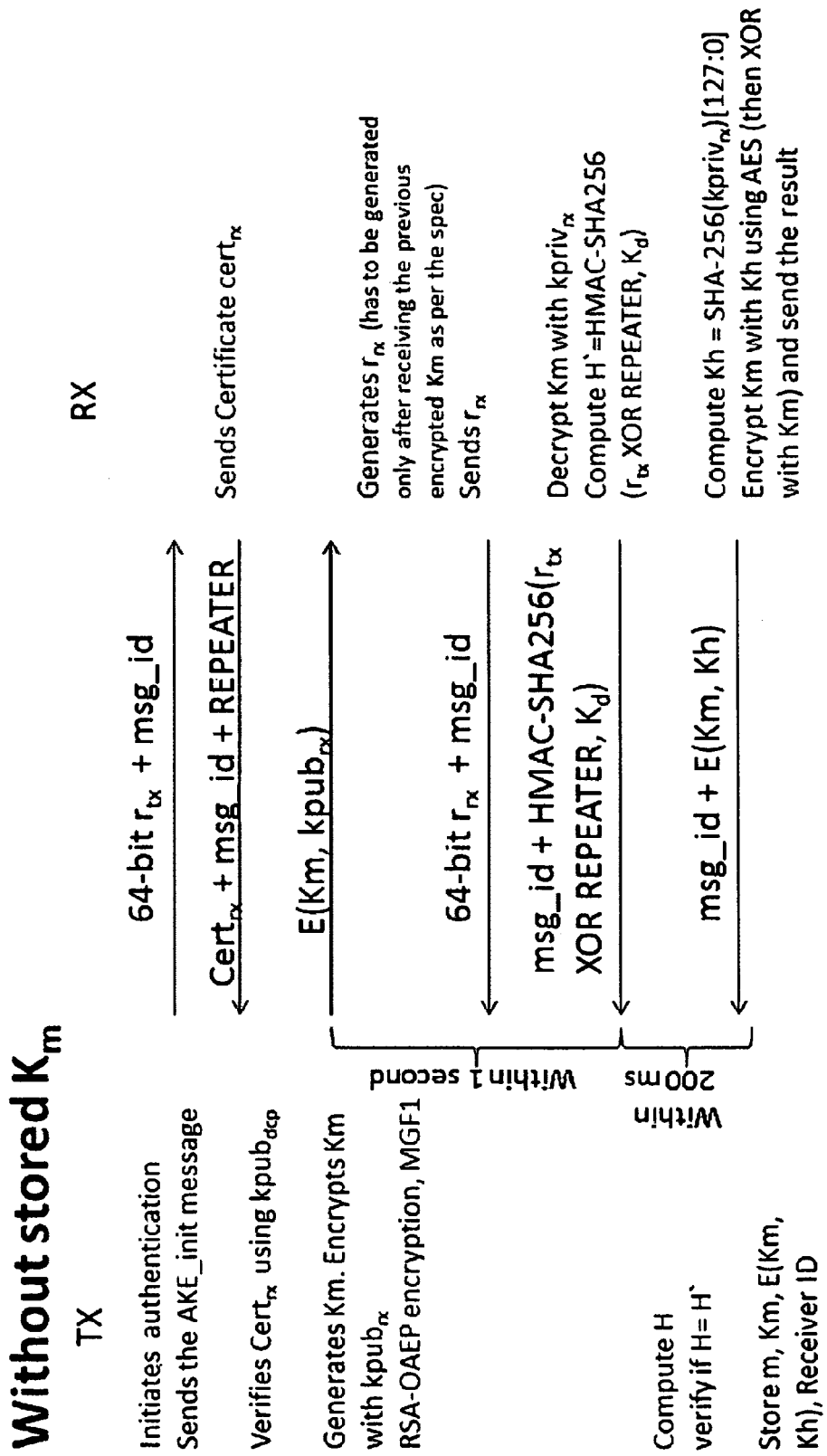
FIG. 8 illustrates the sequence and data flows between a wireless transmitter (without stored master key) and a wireless SoC receiver of a wireless display system during authentication of the receiver according to an exemplary embodiment of the present disclosure.
Figure 9:
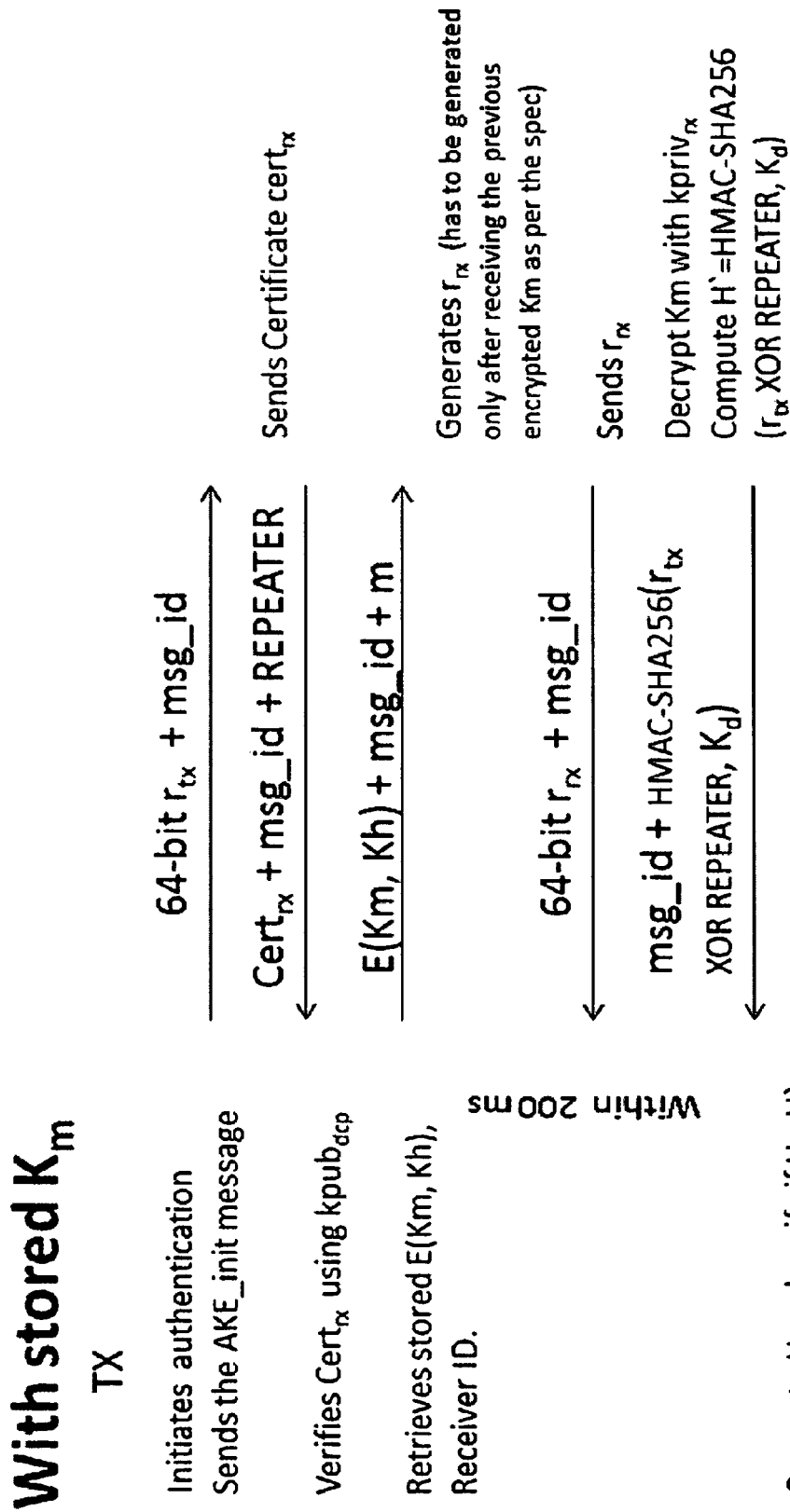
FIG. 9 illustrates the sequence and data flows between a wireless transmitter (with stored master key) and a wireless SoC receiver of a wireless display system during authentication of the receiver according to an exemplary embodiment of the present disclosure.
Figure 10:
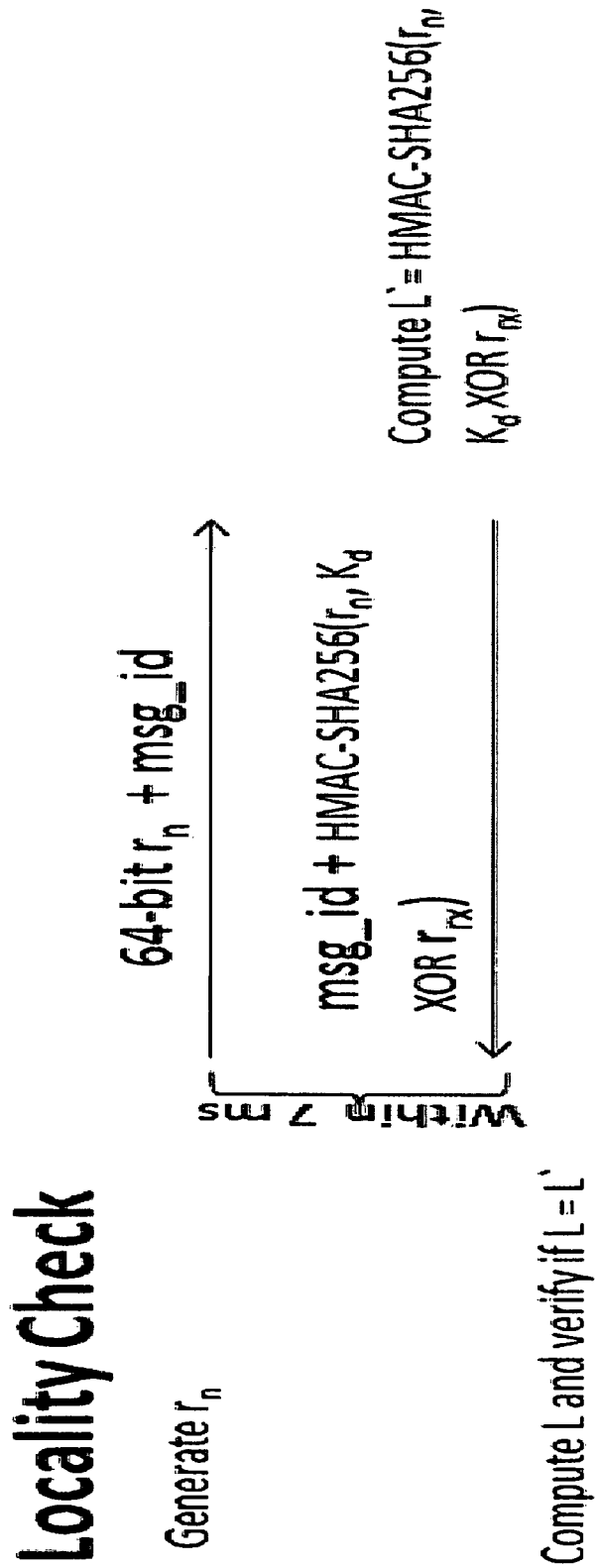
FIG. 10 illustrates the sequence and data flows between a wireless transmitter and a wireless SoC receiver of a wireless display system during locality check of the wireless SoC receiver according to an exemplary embodiment of the present disclosure.

FIG. 8 illustrates the sequence and data flows between a wireless transmitter (e.g., the transmitter 102 of FIG. 1) and a wireless SoC receiver (e.g., the receiver 103 of FIG. 1) during authentication of the receiver according to an exemplary embodiment of the present disclosure. In this example, the transmitter does not have a stored master key Km for the receiver. This means that the transmitter and receiver are communicating with each other for the first time. FIG. 9 illustrates the sequence and data flows between the transmitter (e.g., the transmitter 102 of FIG. 1) and the SoC receiver (e.g., the receiver 103 of FIG. 1) during authentication of the receiver according to an exemplary embodiment of the present disclosure. In this example, the transmitter has a stored master key Km for the receiver. This means that the transmitter and receiver have communicated with each other before. FIG. 10 illustrates the sequence and data flows between (e.g., the transmitter 102 of FIG. 1) and the SoC receiver (e.g., the receiver 103 of FIG. 1) during locality check of the wireless SoC receiver according to an exemplary embodiment of the present disclosure. Locality check refers to determining that the receiver is within a predetermined transmission range of the transmitter. FIG. 11 illustrates the sequence and data flows between the transmitter (e.g., the transmitter 102 of FIG. 1) and the SoC receiver (e.g., the receiver 103 of FIG. 1) during session key exchange and decryption according to an exemplary embodiment of the present disclosure. These sequences and data flows will be described in more detail below.

In FIG. 8, TX represents the transmitter side and RX represents the receiver side. Arrows indicate the data flow directions. The symbols above the arrow lines indicate data transmitted during authentication and key exchange. As can be seen from FIG. 8, the transmitter first sends an AKE_init (Authentication and Key Exchange Initiation) message to the receiver to initiate the authentication operation. The AKE_init message includes a 64 bit random number $r_{tx}$ generated by the transmitter and a message ID. The random number $r_{tx}$ serves both as device ID of the transmitter and the authentication request.

Upon receiving the AKE_init message, the receiver sends back a certificate $\text{Cert}_{rx}$. As described above in connection with FIGS. 2-7, this is done by the processor (e.g., the processor 202 of FIG. 2) of the SoC receiver (e.g., the receiver 200). The certificate $\text{Cert}_{rx}$ is stored in a flash memory of the receiver. The transmitter then verifies the $\text{Cert}_{rx}$ using public key $\text{Kpub}_{dcp}$. At this time, the processor of the receiver also passes the random number $r_{tx}$ to the authentication processor (e.g., the authentication processor 206 of FIG. 2) to start the authentication and key exchange operation.

After the transmitter has verified the $\text{Cert}_{rx}$, the master key $K_m$ is generated and encrypted with a receiver public key $\text{Kpub}_{rx}$. As described above, this encryption operation is performed with RSA-1024 with RSA OAEP padding.

The master key $K_m$ is then sent to the receiver. The receiver has its authentication processor decrypt the encrypted master key $K_m$ with a private key $\text{Kpriv}_{rx}$. The private key values used to decrypt the $K_m$ are in the Chinese Remainder Theorem Format. The decryption is carried out in the authentication processor (e.g., the processor 206 of FIG. 2) using Chinese Remainder Theorem calculations.

The receiver, upon receiving the master key $K_m$, also generates a receiver random number $r_{rx}$ and sends it to the transmitter. The generation of the random number $r_{rx}$ is performed by a random number generator within the authentication processor of the receiver. The random number $r_{rx}$ serves as device ID of the receiver and the confirmation that the encrypted master key has been received in the receiver.

The authentication processor of the receiver (e.g., the authentication processor 206 of FIG. 2) then calculates H' value (i.e., $=\text{HMAC-SHA256 }(r_{tx}\text{XOR REPEATER}, K_d)$. The processor of the receiver then sends the H' value to the transmitter. The transmitter computes H value and verifies whether H=H'. If so, the authentication is successful and the transmitter stores the master key $K_m$ and $E(K_m, K_h)$. $E(K_m, K_h)$ is the pairing information which includes the master key $K_m$ and hash of private key $K_h$ of the receiver. If H is not equal to H', the authentication of the receiver fails.

Referring to FIG. 9, the transmitter has created the master key $K_m$ and the sequences and data flows differ from that of FIG. 8 in that there is no master key generation. Instead, there is a master key retrieval function to retrieve the stored pairing information $E(K_m, K_h)$ with receiver ID.

Referring to FIG. 10, the transmitter (e.g., the transmitter 102 of FIG. 1) initiates the locality check by generating and transmitting $r_n$ to the receiver (e.g., the receiver 103 of FIG. 1 or the receiver 200 of FIG. 2). The authentication processor (e.g., the authentication processor 206 of FIG. 2) then computes L' values (i.e., $=\text{HMAC-SHA256}(r_n, k_d\text{XOR } r_{rx})$. The L' values are then sent to the processor of the receiver (e.g., the processor 202 of FIG. 2) via a shared memory between the two processors. The L' values are then sent back to the transmitter for verification with the L values calculated in the transmitter. For the successful completion of authentication and locality check, the computed L' values have to be transmitted to the transmitter within a predetermined time period (e.g., as shown in FIG. 10). When the transmitter initiates the message for the locality check, it sets up a watchdog timer. The message from the receiver should reach the transmitter within the time specified.

In FIG. 11, after successful completion of authentication and locality check, the transmitter (e.g., the transmitter 102 of FIG. 1) starts the procedure of session key exchange. The session key is used by the decryption processor (e.g., the decryption processor 208 of FIG. 2) to decrypt encrypted content sent by the transmitter. Thus, the session key is the decryption key.

As can be seen from FIG. 11, the transmitter initiates the procedure by generating the session key $K_s$ and a 64 bit pseudo-random number $r_{iv}$. The transmitter then performs key derivation to generate dkey2. The transmitter then encrypts the 128 session key to be $E_{dkey}(K_s)=K_s\text{XOR}$ (dkey$_2$XORr$_{rx}$). The transmitter then sends the encrypted session key K$_s$ with the 64 bit pseudo-random number r$_{iv}$ to the receiver.

The authentication processor (e.g., the authentication processor 206 of FIG. 2) then receives the encrypted session key K$_s$ with r$_{iv}$, decrypts the session key. This is done by first performing key derivation to generate dkey$_2$. Then the authentication processor decrypts the 128 bit session key K$_s$ to be E$_{dkey}$(K$_s$)XOR(dkey$_2$XORr$_{rx}$). The authentication processor also calculates Ks XOR 1c128 and sends the decrypted session key to the decryption processor (e.g., the decryption processor 208 of FIG. 2) via the backdoor key loading. Before the decrypted session key is loaded to the decryption processor, the decrypted session key is stored in a processor register of the authentication processor and is not accessible by software codes running on the main processor (e.g., the processor 202 of FIG. 2). This provides secure and robust content protection for the wireless display system such as the system 100 of FIG. 1.

Embodiments of the present disclosure may be provided as a computer program product, or software, that may include an article of manufacture on a machine accessible or machine readable medium having instructions. The instructions on the machine accessible or machine readable medium may be used to program a computer system or other electronic device. The machine-readable medium may include, but is not limited to, floppy diskettes, optical disks, CD-ROMs, and magneto-optical disks or other type of media/machine-readable medium suitable for storing or transmitting electronic instructions. The techniques described herein are not limited to any particular software configuration. They may find applicability in any computing or processing environment. The terms "machine accessible medium" or "machine readable medium" used herein shall include any medium that is capable of storing, or encoding a sequence of instructions for execution by the machine and that cause the machine to perform any one of the methods described herein. Furthermore, it is common in the art to speak of software, in one form or another (e.g., code, program, procedure, process, application, module, unit, logic, block, and so on) as taking an action or causing a result. Such expressions are merely a shorthand way of stating that the execution of the software by a processing system causes the processor to perform an action to produce a result.

The following examples pertain to further embodiments. In one embodiment, a content processing integrated circuit includes a system-on-a-chip (SoC) that further includes a processor to receive an authentication request from an external device for authenticating if the SoC is permitted to receive encrypted content from the external device, and to receive the encrypted content once the SoC is authenticated. An authentication processor is provided and coupled to the processor to authenticate the SoC to the external device when the processor receives the authentication request, and to generate a decryption key for decrypting the encrypted content. A decryption processor is provided and coupled to the processor and the authentication processor to receive the decryption key from the authentication processor and to decrypt the encrypted content with the decryption key.

In another embodiment, the authentication processor is a security engine processor separate from the processor and is coupled to the processor via a communication link.

In yet another embodiment, the security engine processor further comprises a memory within the security engine processor that stores software instructions that, when executed by the security processor, implement a predetermined content protection protocol which is also implemented by the external device.

In a further embodiment, wherein the predetermined content protection protocol is High-bandwidth Digital Content Protection (HDCP) protocol.

In a further embodiment, the authentication processor includes a processor register that stores the generated decryption key before the decryption key is sent directly to the decryption processor. The decryption key is not sent to the processor and is not exposed to any software running on the processor.

In a further embodiment, the decryption processor is separate from the processor and is coupled to the processor via a communication link. The decryption processor further performs a transport stream de-multiplexing function to separate video content from audio content in the encrypted content before the encrypted content is decrypted.

In a further embodiment, the decryption key is a session-based key that expires after a session is completed.

In a further embodiment, the above-referenced content processing integrated circuit further comprises a wireless communication module coupled to the processor to receive the authentication request and the encrypted content from the external device wirelessly and to pass the authentication request and the encrypted content to the processor. The wireless communication module is also coupled to the authentication processor to communicate authentication information between the external device and the authentication processor.

In a further embodiment, a wireless display system includes a content source device to generated and transmit encrypted content wirelessly, a system-on-a-chip (SoC) wireless receiver to receive an authentication request from the content source device for authenticating if the receiver is permitted to receive the encrypted content and to receive the encrypted content once the receiver is authenticated, and a content rendering device coupled to the receiver to receive and display the decrypted content. The SoC wireless receiver further includes a processor coupled to receive the authentication request and the encrypted content, an authentication processor coupled to the processor to (1) authenticate the receiver to the content source device upon the processor receiving the authentication request and (2) generate a decryption key for decrypting the encrypted content, and a decryption processor coupled to receive the decryption key from the authentication processor and to decrypt the encrypted content with the decryption key.

In a further embodiment, the authentication processor is a security engine processor separate from the processor and is coupled to the processor via a communication link. The security engine processor further comprises a memory within the security engine processor that stores software instructions that, when executed by the security processor, implement a predetermined content protection protocol which is also implemented by the content source device to encrypt the encrypted content.

In a further embodiment, the predetermined content protection protocol is High-bandwidth Digital Content Protection (HDCP) protocol.

In a further embodiment, the authentication processor includes a processor register that stores the generated decryption key before the decryption key is sent directly to the decryption processor, wherein the decryption key is not sent to the processor and is not exposed to any software running on the processor.

In a further embodiment, the decryption processor is separate from the processor and is coupled to the processor via a communication link. The decryption processor further performs a transport stream de-multiplexing function to separate video content from audio content in the encrypted content before the encrypted content is decrypted.

In a further embodiment, the decryption key is a session-based key that expires after a session is completed.

In a further embodiment, the wireless display system further includes a wireless communication module coupled to the processor to receive the authentication request and the encrypted content from the content source device wirelessly and to pass the authentication request and the encrypted content to the processor. The wireless communication module is also coupled to the authentication processor to communicate authentication information between the content source device and the authentication processor.

In a further embodiment, a method of providing secure and robust content protection in a system-on-a-chip (SoC) media processing apparatus includes receiving, in a processor of the SoC media processing apparatus, an authentication request from an external device for authenticating if the SoC media processing apparatus is permitted to receive encrypted content from the external device and to receive the encrypted content once the SoC media processing apparatus is authenticated; causing the authentication processor to (1) authenticate the SoC media processing apparatus to the external device in accordance with a pre-determined content protection protocol and (2) generate a decryption key for the encrypted content encrypted according to the pre-determined content protection protocol; and receiving, by the processor, the encrypted content from the external device and sending the encrypted content to a decryption processor of the SoC media processing apparatus to cause the decryption processor to decrypt the encrypted content with the decryption key received directly from the authentication processor once the SoC media processing apparatus is authenticated and the decryption key is generated.

In a further embodiment, the above-referenced method further includes sending, by the processor, a certificate of the SoC media processing apparatus to the external device upon receiving the authentication request.

In a further embodiment, the above-referenced method further includes receiving an encrypted master key in the processor from the external device after sending the certificate; sending the encrypted master key to the authentication processor for decryption; receiving confirmation of decryption of the master key in the form of a random generated number from the authentication processor; and sending the random generated number to the external device to confirm decryption and verification of the master key.

In a further embodiment, the above-referenced method further includes causing the authentication processor to respond to a locality check request from the external device.

In a further embodiment, wherein causing the authentication processor to generate a decryption key for the encrypted content further includes receiving an encrypted session key from the external device; and sending the encrypted session key to the authentication processor for decryption to become the decryption key.

In a further embodiment, the above-referenced method further includes causing the decryption processor to receive the decryption key directly from the authentication processor via backdoor key loading once the SoC media processing apparatus is authenticated and the decryption key is generated and stored in the authentication processor.

In a further embodiment, a computer-readable medium having sequences of instructions, the sequences of instructions including instructions which, when executed, cause a processor to perform device authentication and content decryption, which include receiving an authentication request from an external device for authenticating if the processor is permitted to receive encrypted content from the external device and to receive the encrypted content once the processor is authenticated; causing an external authentication processor separate from the processor to (1) authenticate the processor to the external device in accordance with a pre-determined digital content protection protocol and (2) generate a decryption key for the encrypted content encrypted according to the pre-determined digital content protection protocol; receiving the encrypted content from the external device and causing a decryption processor separate from the processor to receive the decryption key directly from the authentication processor once the processor is authenticated and the decryption key is generated; and sending the encrypted content to the decryption processor for decryption with the decryption key.

In a further embodiment, the decryption key is a decrypted session key encrypted at the external device and sent to the processor.

In a further embodiment, the above-referenced computer-readable medium further includes causing the decryption processor to receive the decrypted session key directly from the authentication processor via backdoor key loading.

In a further embodiment, the above-referenced computer-readable medium further includes sending, by the processor, a certificate of the processor to the external device upon receiving the authentication request; receiving an encrypted master key in the processor from the external device after sending the certificate; sending, by the processor, the encrypted master key to the authentication processor for decryption; receiving confirmation of decryption of the master key in the form of a random generated number from the authentication processor; and sending the random generated number to the external device to confirm decryption and verification of the master key.

In a further embodiment, the above-referenced computer-readable medium further includes causing the authentication processor to respond to a locality check request from the external device.

In a further embodiment, wherein causing the authentication processor to generate a decryption key for the encrypted content further includes receiving an encrypted session key from the external device; and sending the encrypted session key to the authentication processor for decryption to become the decryption key.

While the disclosure has been illustrated and described in detail in the drawings and foregoing description, such an illustration and description are to be regarded as exemplary and not restrictive. It should be understood that only illustrative embodiments of the disclosure have been shown and described and that all changes and modifications consistent with the disclosure and recited claims are intended to be protected.

What is claimed is:

1. A content processing integrated circuit, comprising:
a system-on-a-chip (SoC) further comprising
 a processor to receive an authentication request from an external device for authenticating if the SoC is permitted to receive encrypted content from the external device and to receive the encrypted content once the SoC is authenticated;
 an authentication processor coupled to the processor to authenticate the SoC to the external device when the processor receives the authentication request, and to generate a decryption key for decrypting the encrypted content once the SoC is authenticated; and a decryption processor coupled to the processor and the authentication processor to receive the decryption key from the authentication processor and to decrypt the encrypted content with the decryption key.

2. The content processing integrated circuit of claim 1, wherein the authentication processor is a security engine processor separate from the processor and is coupled to the processor via a communication link.

3. The content processing integrated circuit of claim 2, wherein the security engine processor further comprises a memory within the security engine processor that stores software instructions that, when executed by the security processor, implement a predetermined content protection protocol which is also implemented by the external device.

4. The content processing integrated circuit of claim 3, wherein the predetermined content protection protocol is High-bandwidth Digital Content Protection (HDCP) 2.0 protocol.

5. The content processing integrated circuit of claim 1, wherein the authentication processor includes a processor register that stores the generated decryption key before the decryption key is sent directly to the decryption processor, wherein the decryption key is not sent to the processor and is not exposed to any software running on the processor.

6. The content processing integrated circuit of claim 1, wherein the decryption processor is separate from the processor and is coupled to the processor via a communication link, wherein the decryption processor further performs a transport stream de-multiplexing function to separate video content from audio content in the encrypted content before the encrypted content is decrypted.

7. The content processing integrated circuit of claim 1, wherein the decryption key is a session-based key that expires after a session is completed.

8. The content processing integrated circuit of claim 1, further comprising a wireless communication module coupled to the processor to receive the authentication request and the encrypted content from the external device wirelessly and to pass the authentication request and the encrypted content to the processor, wherein the wireless communication module is also coupled to the authentication processor to communicate authentication information between the external device and the authentication processor.

9. A wireless display system, comprising:
a content source device to generated and transmit encrypted content wirelessly;
a system-on-a-chip wireless receiver to receive an authentication request from the content source device for authenticating if the receiver is permitted to receive the encrypted content and to receive the encrypted content once the receiver is authenticated, further comprising
a processor coupled to receive the authentication request and the encrypted content;
an authentication processor coupled to the processor to (1) authenticate the receiver to the content source device upon the processor receiving the authentication request and (2) generate a decryption key for decrypting the encrypted content;
a decryption processor coupled to receive the decryption key from the authentication processor and to decrypt the encrypted content with the decryption key; and
a content rendering device coupled to the receiver to receive and display the decrypted content.

10. The wireless display system of claim 9, wherein the authentication processor is a security engine processor separate from the processor and is coupled to the processor via a communication link, wherein the security engine processor further comprises a memory within the security engine processor that stores software instructions that, when executed by the security processor, implement a predetermined content protection protocol which is also implemented by the content source device to encrypt the encrypted content.

11. The wireless display system of claim 10, wherein the predetermined content protection protocol is High-bandwidth Digital Content Protection (HDCP) 2.0 protocol.

12. The wireless display system of claim 9, wherein the authentication processor includes a processor register that stores the generated decryption key before the decryption key is sent directly to the decryption processor, wherein the decryption key is not sent to the processor and is not exposed to any software running on the processor.

13. The wireless display system of claim 9, wherein the decryption processor is separate from the processor and is coupled to the processor via a communication link, wherein the decryption processor further performs a transport stream de-multiplexing function to separate video content from audio content in the encrypted content before the encrypted content is decrypted.

14. The wireless display system of claim 9, wherein the decryption key is a session-based key that expires after a session is completed.

15. The wireless display system of claim 9, further comprising a wireless communication module coupled to the processor to receive the authentication request and the encrypted content from the content source device wirelessly and to pass the authentication request and the encrypted content to the processor, wherein the wireless communication module is also coupled to the authentication processor to communicate authentication information between the content source device and the authentication processor.

16. A method of providing secure and robust content protection in a system-on-a-chip (SoC) media processing apparatus, comprising:
receiving, in a processor of the SoC media processing apparatus, an authentication request from an external device for authenticating if the SoC media processing apparatus is permitted to receive encrypted content from the external device and to receive the encrypted content once the SoC media processing apparatus is authenticated;
causing the authentication processor to (1) authenticate the SoC media processing apparatus to the external device in accordance with a pre-determined content protection protocol and (2) generate a decryption key for the encrypted content encrypted according to the pre-determined content protection protocol; and
receiving, by the processor, the encrypted content from the external device and sending the encrypted content to a decryption processor of the SoC media processing apparatus to cause the decryption processor to decrypt the encrypted content with the decryption key received directly from the authentication processor once the SoC media processing apparatus is authenticated and the decryption key is generated.

17. The method of claim 16, further comprising sending, by the processor, a certificate of the SoC media processing apparatus to the external device upon receiving the authentication request.

18. The method of claim 17, further comprising:
receiving an encrypted master key in the processor from the external device after sending the certificate;

sending the encrypted master key to the authentication processor for decryption;

receiving confirmation of decryption of the master key in the form of a random generated number from the authentication processor; and sending the random generated number to the external device to confirm decryption and verification of the master key.

19. The method of claim 16, further comprising causing the authentication processor to respond to a locality check request from the external device.

20. The method of claim 16, wherein causing the authentication processor to generate a decryption key for the encrypted content further comprises:

receiving an encrypted session key from the external device; and sending the encrypted session key to the authentication processor for decryption to become the decryption key.

21. The method of claim 16, further comprising causing the decryption processor to receive the decryption key directly from the authentication processor via backdoor key loading once the SoC media processing apparatus is authenticated and the decryption key is generated and stored in the authentication processor.

22. A non-transitory computer-readable medium having sequences of instructions, the sequences of instructions including instructions which, when executed, cause a processor to perform device authentication and content decryption, comprising:

receiving an authentication request from an external device for authenticating if the processor is permitted to receive encrypted content from the external device and to receive the encrypted content once the processor is authenticated;

causing an external authentication processor separate from the processor to (1) authenticate the processor to the external device in accordance with a pre-determined digital content protection protocol and (2) generate a decryption key for the encrypted content encrypted according to the pre-determined digital content protection protocol;

receiving the encrypted content from the external device and causing a decryption processor separate from the processor to receive the decryption key directly from the authentication processor once the processor is authenticated and the decryption key is generated; and sending the encrypted content to the decryption processor for decryption with the decryption key.

23. The non-transitory computer-readable medium of claim 22, wherein the decryption key is a decrypted session key encrypted at the external device and sent to the processor.

24. The non-transitory computer-readable medium of claim 23, further comprising causing the decryption processor to receive the decrypted session key directly from the authentication processor via backdoor key loading.

25. The non-transitory computer-readable medium of claim 22, further comprising:

sending, by the processor, a certificate of the processor to the external device upon receiving the authentication request;

receiving an encrypted master key in the processor from the external device after sending the certificate;

sending, by the processor, the encrypted master key to the authentication processor for decryption;

receiving confirmation of decryption of the master key in the form of a random generated number from the authentication processor; and sending the random generated number to the external device to confirm decryption and verification of the master key.

26. The non-transitory computer-readable medium of claim 22, further comprising causing the authentication processor to respond to a locality check request from the external device.

27. The non-transitory computer-readable medium of claim 22, wherein causing the authentication processor to generate a decryption key for the encrypted content further comprises:

receiving an encrypted session key from the external device; and sending the encrypted session key to the authentication processor for decryption to become the decryption key.

* * * * *